United States Patent [19]

Whittenburg et al.

[11] Patent Number: 4,509,412
[45] Date of Patent: Apr. 9, 1985

[54] FOOD STEAMING DEVICE

[75] Inventors: Stephen L. Whittenburg, Overland Park, Kans.; David D. McCormick; William J. Tweed, both of Kansas City, Mo.; A. Aykut Ozgunay, Clinton, Mo.; James T. Williams, Sacramento, Calif.

[73] Assignee: Rival Manufacturing Company, Kansas City, Mo.

[21] Appl. No.: 472,193

[22] Filed: Mar. 4, 1983

[51] Int. Cl.³ .............................................. A47J 27/04
[52] U.S. Cl. ........................................ 99/331; 99/413; 99/446; 126/20; 126/369; 219/401; 219/441; 426/510
[58] Field of Search ................ 99/331, 410, 413, 446, 99/447, 347; 126/20.5, 369, 381; 122/492; 137/200, 201; 219/401, 441, 442; 426/510, 511

[56] References Cited

U.S. PATENT DOCUMENTS

| 244,180 | 7/1881 | Campbell | 126/369 |
|---|---|---|---|
| 263,049 | 8/1882 | Krehbiel | 126/369 |
| 282,587 | 8/1883 | Swink | 126/369 |
| 354,240 | 12/1886 | Roberts | 126/381 X |
| 366,960 | 7/1887 | Johnson et al. | 99/447 X |
| 560,336 | 5/1896 | Willson | 126/369 |
| 636,528 | 11/1899 | Henderson | 99/410 X |
| 776,926 | 12/1904 | Misener | 126/369 |
| 790,851 | 1/1905 | Wilson | 62/241 |
| 926,028 | 6/1909 | Smith | 126/369 |
| 2,145,263 | 1/1939 | Huntzinger et al. | 126/369 |
| 2,554,412 | 5/1951 | Kavanagh | 99/446 X |
| 2,622,591 | 12/1952 | Bramberry | 126/381 |
| 2,761,375 | 9/1956 | Jepson | 99/331 X |
| 2,947,304 | 8/1960 | Ashley | 126/381 |
| 3,078,783 | 2/1963 | Lee, Sr. | |
| 3,147,689 | 9/1964 | Sakamoto et al. | 99/331 |
| 3,485,163 | 12/1969 | Arita | 99/413 |
| 3,659,584 | 5/1972 | Doyle et al. | 126/369 |

FOREIGN PATENT DOCUMENTS

| 75371 | 2/1919 | Austria | 99/446 |
|---|---|---|---|
| 271879 | 8/1927 | Fed. Rep. of Germany | 126/369 |
| 1082456 | 12/1954 | France | 126/20 |
| 2329 | of 1909 | United Kingdom | 99/467 |
| 5969 | of 1912 | United Kingdom | 126/20 |
| 7612 | of 1913 | United Kingdom | 99/446 |
| 209721 | 11/1924 | United Kingdom | 99/413 |

Primary Examiner—Billy J. Wilhite
Attorney, Agent, or Firm—Willian Brinks Olds Hofer Gilson & Lione Ltd.

[57] ABSTRACT

A steam cooking utensil is disclosed which includes a base; a boiling water reservoir and a condensate trough defined by the base; and a heater disposed centrally to the boiling water reservoir, mounted in the base, and coupled to a thermostat also mounted in the base. The condensate trough is disposed in annular relationship to the boiling water reservoir. A food tray defining a imperforate central surface and an array of peripheral aperatures is supported such that the imperforate surface is vertically aligned with the boiling water reservoir and the array of peripheral apertures is vertically aligned with the condensate trough. A cover having a bottom opening defined by a rim is positioned over the food tray, condensate trough and boiling water reservoir, such that the rim cooperates with an outer peripheral lip of the condensate trough to form a seal. The disclosed steam cooking utensil operates to cook food quickly, cleanly and efficiently. The boiling water reservoir remains free from condensate residues even after boiling dry, and the food product remains free from excess moisture.

32 Claims, 7 Drawing Figures

1

FOOD STEAMING DEVICE

BACKGROUND OF THE INVENTION

This invention relates to a steam cooking utensil which is heat efficient, easy to use and easy to clean. It may be left to boil dry without burning or emitting foul odors and it operates to limit food contact with condensate.

In the past, many commonly used steam cooking utensils permitted steam to condense and circulate back to the boiling water reservoir after contacting the food. If the system boiled dry, food matter carried by the condensate would bake on to the reservoir surface. Foul odors were emitted and cleaning was difficult.

Further, conventional steamers often permitted condensate to accumulate on the food. The food soaked in this liquid during the entire steaming process. It became soggy and unpalatable. Attempts to resolve the problem by limiting live steam entry into the cooking chamber were not without drawbacks: condensate which accumulated while the food was cold remained there to soak into the food.

Finally, older models tended towards a lesser degree of heat efficiency because a large volume of water required heating before initial steam formation could occur. Conventional steam cooking utensils have traditionally failed to provide the homemaker with a quick, clean and efficient way to steam vegetables and other foods without soaking them in condensate.

Thus, there presently exists a need for a steam cooking utensil which may be left to boil dry without the emission of foul odors, which will yield a food product free from sogginess, and which will operate to cook food quickly and efficiently.

SUMMARY OF THE INVENTION

An important object of the present invention is to provide an improved steam cooking utensil which keeps condensate separate from the original steam source after contact with the food. According to this aspect of the invention, a condensate trough, separate from a boiling water reservoir, is provided for the collection of condensate. Condensate does not drain from the food back to the boiling water reservoir, and the boiling water reservoir can therefore boil dry without leaving a residue of food matter. This prevents odors caused by burning food matter and facilitates cleaning.

A further object of this invention is to limit contact between the condensate and cooking food. According to this aspect of the invention, a food tray is provided which comprises two regions: an imperforate surface and a drainage surface through which condensate will flow. The food tray may be of any shape, and may be formed with or without sides, so long as the food tray permits flow of condensate into the condensate trough and prevents return of condensate to the boiling water reservoir. The imperforate portion of the tray is positioned over the boiling water reservoir, while the drainage surface is aligned with the condensate trough such that condensate drains into it rather than soaking the food. This arrangement has been found effective to prevent a soggy and unpalatable food product.

Yet another object of this invention is to facilitate efficient heat transfer and shortened steaming time. According to this aspect of the invention, a central baffle extending below the imperforate surface of the food tray operates to contain heated water in a vertical relationship with the heater, resulting in steam formation before peripheral water is fully heated. A lower flange defined by the food tray cooperates with a peripheral lip defined by the condensate trough to create a labrynthian seal operative to impede the loss of heated water from the boiling water reservoir.

The preferred embodiment of this invention described below provides a number of important advantages. The annular positioning of the condensate trough with respect to the boiling water reservoir is compact and aesthetically pleasing. The oval shape is convenient for elongated vegetables, such as corn on the cob and squash. Heat is generated from the center of the boiling water reservoir such that thermal insulation around the periphery is efficient: simply the result of radial heat loss and heat insulating material. In addition, the high domed cover permits steaming of a generous quantity of vegetables or other food.

The steam cooking utensil of this invention has been found to facilitate clean, quick and efficient steam cooking.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
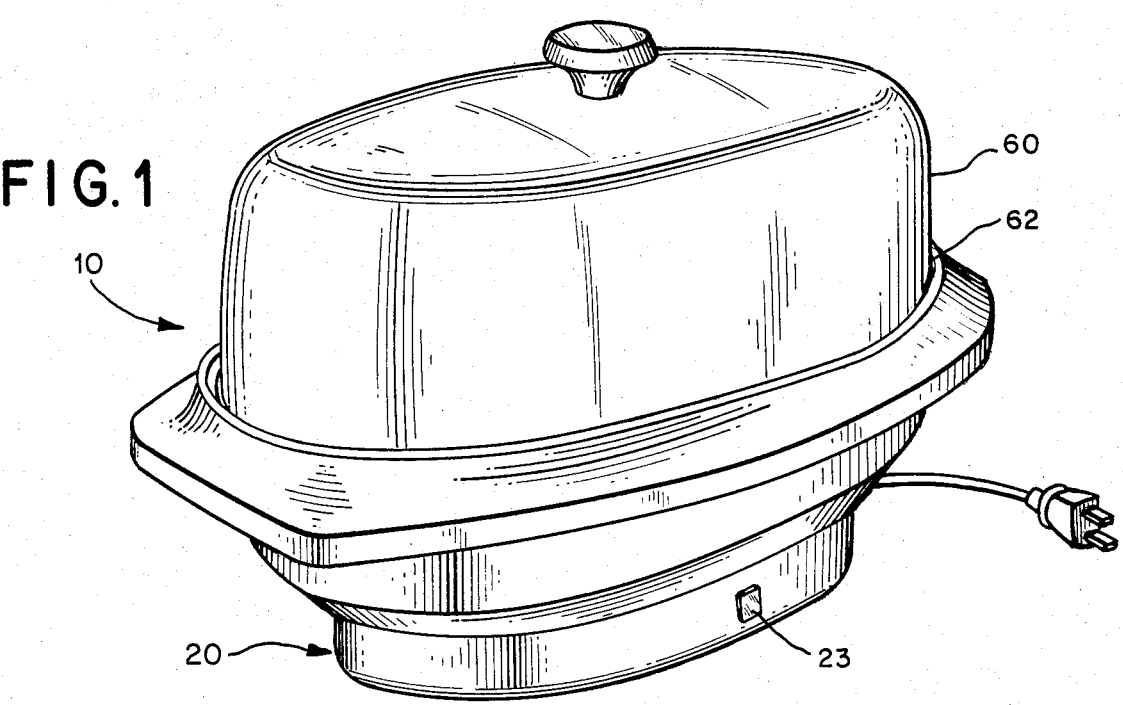
FIG. 1 is a perspective view of a presently preferred embodiment of the steam cooking utensil of this invention.
Figure 2:
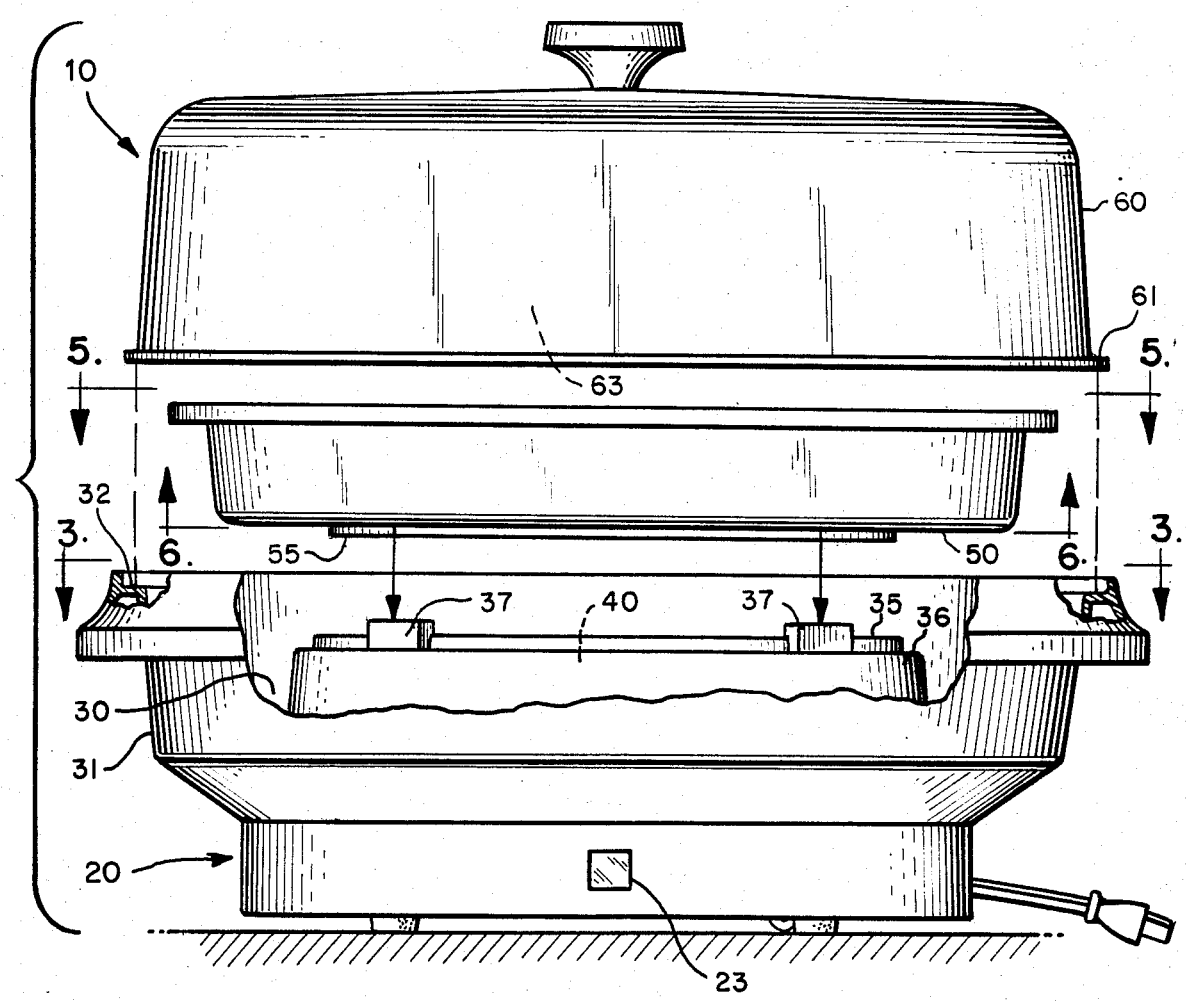
FIG. 2 is an exploded elevational view in partial cutaway of the steam cookinng utensil of FIG. 1.
Figure 3:
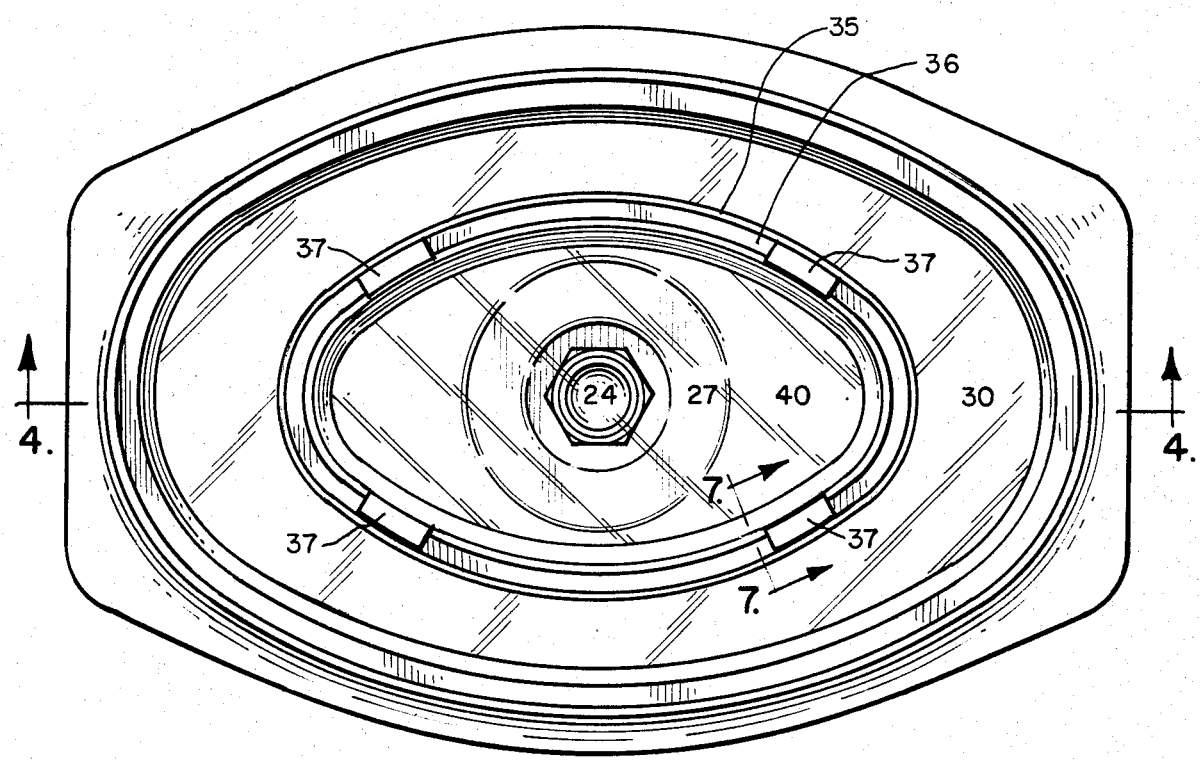
FIG. 3 is a horizontal sectional view taken along line 3—3 of FIG. 2.
Figure 4:
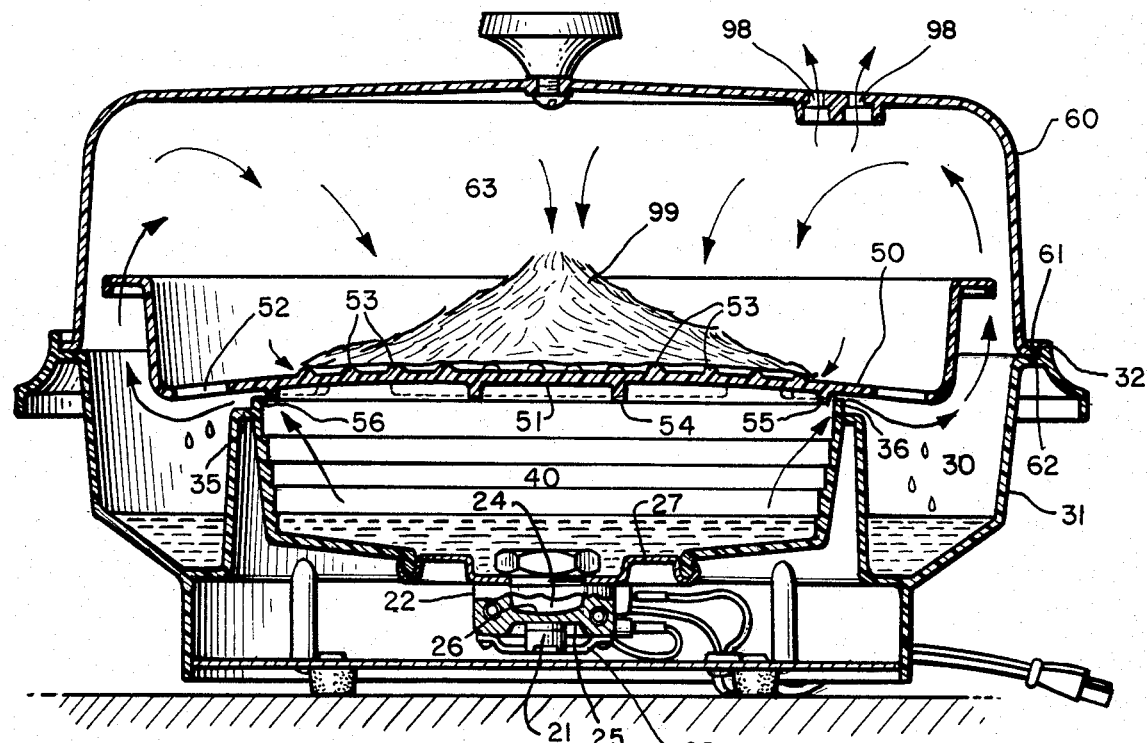
FIG. 4 is a vertical sectional view taken along line 4—4 of FIG. 3.

Turning now to the drawings, FIGS. 1 through 7 show various views of the presently preferred embodiment of the steam cooking utensil 10 of this invention. As shown in FIGS. 1 and 2, this cooking utensil 10 includes a rigid base 20. The base 20 defines a condensate trough 30 disposed in annular relationship to a boiling water reservoir 40. The preferred spatial relationship between the condensate trough 30 and the boiling water reservoir 40 is best illustrated in FIGS. 3 and 4: they are disposed on opposite sides of an inner peripheral wall 35 which defines an inner peripheral lip 36 and a plurality of vertical protrusions 37. The inner peripheral wall 35 is preferably composed of a heat insulating material such as a polypropylene, for example, which may be obtained from Northern Petrochemical Co. as material number 8001LK. The inner peripheral wall 35 is preferably ellipsoidal in shape. The condensate trough 30 is also bounded by an outer peripheral wall 31 of this embodiment which defines an outer peripheral lip 32. The outer peripheral wall 31 of this embodiment is also ellipsoidal in shape. The ratio of the volume of water contained in the boiling water reservoir to that contained in the condensate trough is preferably 1:1.

A steel plate 27, preferably annular in shape, is disposed centrally to the boiling water reservoir 40 and is secured to the base 20. The steel plate 27 serves to mount an electric heater 22 at its inner perimeter, and acts to insulate the base 20 from this heater 22.

The heater 22, disposed centrally to the steel plate 27, is mounted in the base 20. It defines a heater well 24 which comprises a concave surface 26. The heater 22 also defines a central recess 25 directly beneath the heater well 24, such that the concave surface of the heater well 26 is in very close proximity to the recess 25.

A thermostat 21 is seated in the recess 25 such that it is placed as closely as is feasible to the concave surface 26 of the heater well 24 (0.078" in the preferred embodiment). It is firmly secured in place by a spring bracket 28. The thermostat 21 is coupled to the heater 22 and an indicator light 23. The thermostat 21 switches to open circuit at a switching temperature of 274° F., and is circuited such that the power is then removed from both the heater 22 and the light 23.

By way of example, the following can be used for the steel plate 27, the electric heater 22, the thermostat 21 and the spring bracket 28. The steel plate 27 of this embodiment is constructed from corrison resistant 304 stainless steel, 0.035" thick. The heater 22 is preferably constructed of a die cast material, such as type 380 aluminum, and operates at 600 watts at 120 volts. Suitable heaters can be obtained from Encon, Inc., Dallas, Pa. 18612. The thermostat can be of the type distributed by Elmwood Sensors of Cranston, R.I., as part number 2450HR. The spring bracket of this embodiment is 0.025" thick, constructed of 1050 annealed spring steel, heat treated to Rockwell hardness 82/87 on the 15-N scale.

Figure 7:
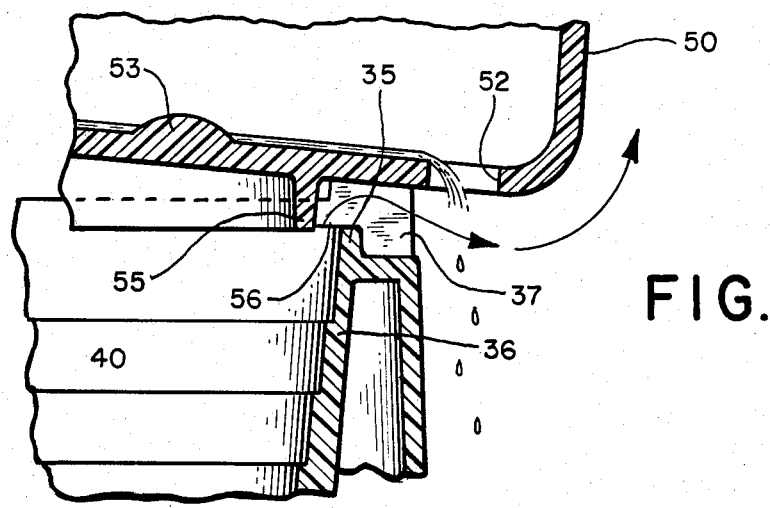
FIG. 7 is an enlarged, fragmentary sectional view showing the protrusions in FIG. 2 supporting the food tray of FIG. 6 and illustrating the path of steam flow.
Figure 5:
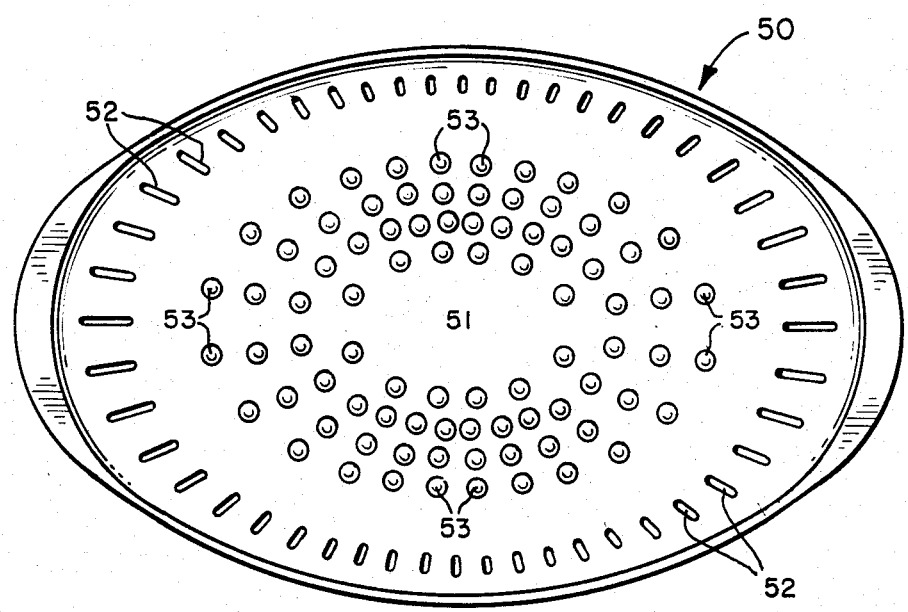
FIG. 5 is a horizontal sectional view taken along line 5—5 of FIG. 2 showing a top view of the food tray of the steam cooking utensil of FIG. 1.
Figure 6:
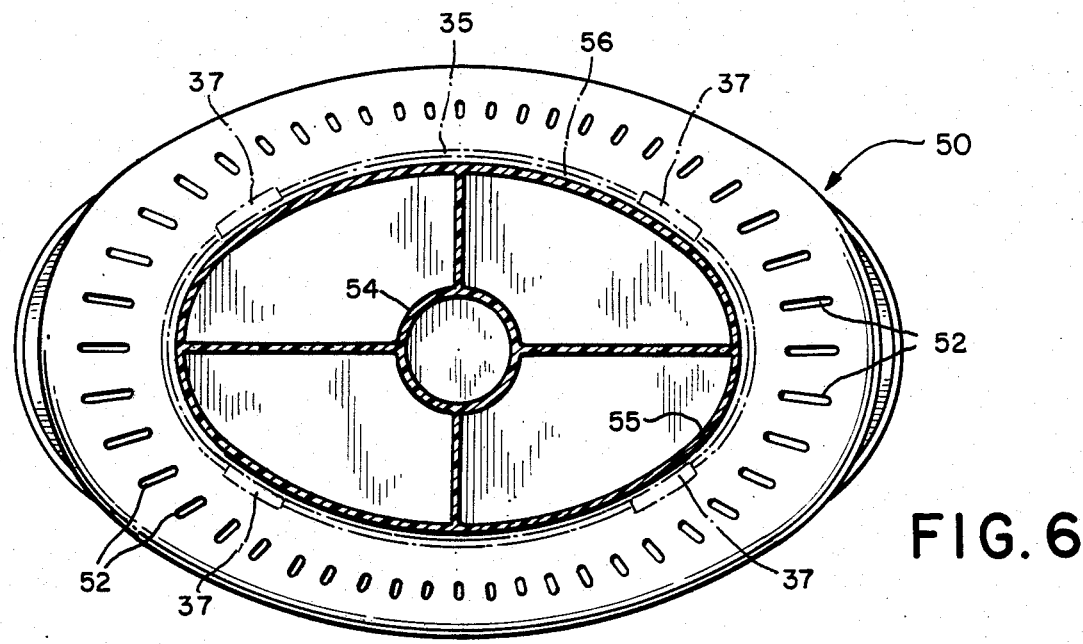
FIG. 6 is a horizontal sectional view taken along line 6—6 of FIG. 2 showing a bottom view of the food tray of the steam cooking utensil of FIG. 1.

FIGS. 5 and 6 show the presently preferred embodiment of a food tray 50, which is included in the utensil 10. This food tray 50 comprises an imperforate surface 51 and an array of peripheral apertures 52. The food tray 50 is preferably ellipsoidal in shape. The food tray 50 is supported, as illustrated in FIGS. 2 and 7, by the vertical protrusions 37 situated above the inner peripheral lip 36 defined by the inner peripheral wall 35. The imperforate surface 51 is vertically aligned with the boiling water reservoir 40, and the array of peripheral apertures 52 is vertically aligned with the condensate trough 30. In the preferred embodiment, the imperforate surface 51 is slightly convex, in order to facilitate drainage of condensate through the peripheral apertures 52 into the condensate trough 30. The shape also acts to prevent the condensate from travelling along the food tray and returning to the boiling water reservoir by means of capillary action. The top view shown in FIG. 5 shows a multiplicity of raised hemispheres 53. As seen in FIG. 4, the raised hemispheres 53 support food 99 above the imperforate surface 51 to facilitate radial drainage.

The bottom view shown in FIG. 6 discloses a central baffle 54 and a lower flange 55. The central baffle 54 is vertically aligned with the heater 22. The lower flange 55 cooperates with the inner peripheral lip 36 to form a labrynthian seal 56. This is best understood from FIG. 7. As used herein, the term "labrynthian seal" is used to denote the slight overlap between the inner peripheral lip 36 and the lower flange 55 such that water or steam must travel a circuitous path to escape from the boiling water reservoir.

Finally, FIG. 2 illustrates a high domed cover 60 having a bottom opening defined by a rim 61, which is positioned such that the rim 61 cooperates with the outer peripheral lip 32 of the condensate trough 30 to form an outer seal 62. The cover defines an upper chamber 63. The cover 60 is constructed of a polypropylene, such as the polypropylene obtainable from Northern Petrochemical Co. as material number 8001LK. As seen in FIG. 4, the cover 60 defines a steam vent 98 such that the pressure in the upper chamber 63 is maintained substantially at atmospheric pressure.

Having described the structure of this preferred embodiment, its operation can now be described in detail. The boiling water reservoir 40 is first filled with a measured amount of water. Then, food is placed upon the imperforate surface 51 of the food tray 50, and the food tray 50 is positioned upon the vertical protrusions 37 of the inner peripheral lip 36. The cover 60 is positioned such that its rim 61 cooperates with the outer peripheral lip 32 of the condensate trough 30 to form the outer seal 62. The steam cooking utensil is plugged then into a wall socket. The heater 22 heats water in the heater well 24, and steam quickly forms and travels along a path through the labrynthian seal 56 and into the upper chamber 63. The steam condenses upon food on the imperforate surface 51 of the food tray 50, thereby heating the food. Condensate then drains from the food, through the array of peripheral apertures 52 in the food tray 50, and collects in the condensate trough 30. When the water boils dry in the boiling water reservoir 40, the temperature of the heater 22 increases. This activates the thermostat 21 which turns off the indicator light 23 and the heater 22, thereby completing the cooking operation.

One of the important advantages of this invention is that no condensate travels from the food to the boiling water reservoir 40, hence food matter does not cake on the heater 22 when the system boils dry. Furthermore, the condensate in the trough 30 never boils dry because it is thermally insulated from the heater 22. In addition, the baffle 54 promotes local heating of water in the boiling water reservoir adjacent the heater 22 and quicker steaming time; the labrynthian seal 56 promotes conservation of water in the boiling water reservoir; and the domed food tray 50 permits good drainage of water away from food. In summary, this invention provides a quick and efficient device for steaming food that can boil dry without baking condensate residues.

It should be understood that the present invention is not limited to the precise structure described above. Rather, a wide range of modifications can be made to this steam cooking utensil without departing from the spirit of the invention. For example, the condensate trough need not be disposed in annular relationship to the boiling water reservoir, and need not be oval in shape. Rather, a wide variety of shapes and arrangements can be adapted for use with this invention. As an example of some of the minor variations that can be made to the preferred embodiments shown and described, the boiling water reservoir can be situated to one side of the condensate trough, or on a different horizontal plane from the condensate trough. Alternately, the boiling water reservoir can, for example, define a cube-shaped volume central to a condensate trough of an irregular shape. These and the following examples of possible alternatives are given to illustrate some of the minor variations that fall squarely within the scope of the present invention.

Accordingly in other minor variations, the food tray need not be slightly convex, ellipsoidal in shape, and comprising a continuous central surface and an annular array of peripheral apertures. Rather, it may be rectangular in shape, sloped along an incline, shaped to define a linear array of apertures at the low end and an imperforate surface at the high end, and positioned such that the high end is supported over a boiling water reservoir and the low end is supported of a condensate trough. In fact, the food tray need not define apertures at all so long as it defines a drainage surface. For example, the food tray may be completely without sides, and shaped such that condensate simply flows off the end of the food tray and into a condensate trough. These examples are by way of illustration and not of limitation.

Moreover, the baffle 54 and the flange 55 described above can be used in other types of steaming devices which do not drain food condensate into a separate trough as described above. Such baffles and flanges can be used with a standard steaming container which is open only at the top and retains food condensate. For example, a rice steaming container can be used with the base 20 described above, and this container can be provided with an unperforated lower surface as well as a baffle and flange similar to the elements 54,55 described above. In this arrangement, the baffle and flange provide the same advantages as those described above in connection with the illustrated embodiment.

In addition, materials, details of construction, and dimensions can be varied as needed to suit individual applications.

Thus, a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:
1. A steam cooking utensil comprising:
   a base;
   a boiling water reservoir defined by the base;
   a heater, mounted in the base to heat liquid in the boiling water reservoir;
   thermostat means, mounted in the base and coupled to the heater, for switching off the heater when all the liquid in the boiling water reservoir has evaporated therefrom;
   a condensate trough, defined by the base and thermally insulted from the heater; and
   a food tray comprising an imperforate surface and a drainage surface, said food tray supported above the reservoir and trough such that said imperforate surface is aligned with the boiling water reservoir, said drainage surface is aligned with the condensate trough, and water flows from the imperforate surface to the drainage surface and into the condensate trough, said reservoir, trough and tray cooperating substantially to prevent the flow of water from the imperforate surface into the reservoir.

2. The invention of claim 1 wherein the food tray comprises a surface shaped to facilitate radial drainage to the drainage surface and into the condensate trough.

3. The invention in claim 1 wherein the food tray defines a central baffle, vertically aligned with the heater, said baffle operative to direct heated water back to the vicinity of the heater in order to accelerate steam formation.

4. The invention of claim 1 wherein the condensate trough is disposed around the boiling water reservoir, and comprises an inner peripheral wall, an outer peripheral wall, and an outer peripheral lip disposed adjacent to the outer peripheral wall.

5. The invention of claim 4, further comprising a cover which defines a rim, said rim cooperating with the outer peripheral lip to form an outer seal, and said cover also comprising means for venting pressure within the steam cooking utensil.

6. The invention of claim 1 wherein the imperforate surface defines a multiplicity of raised surfaces effective to facilitate radial drainage through the drainage surface into the condensate trough.

7. A steam cooking utensil comprising:
   a base;
   a boiling water reservoir defined by the base;
   a heater, mounted in the base to heat the boiling water reservoir;
   a condensate trough, defined by the base and thermally insulated from the heater; and
   a food tray comprising an imperforate surface and a drainage surface, said food tray supported above the reservoir and trough such that said imperforate surface is aligned with the boiling water reservoir, said drainage surface is aligned with the condensate trough, and water flows from the imperforate surface to the drainage surface and into the condensate trough, said reservoir, trough and tray cooperating substantially to prevent the flow of water from the imperforate surface into the reservoir;
   wherein said reservoir defines an inner peripheral lip and wherein the food tray defines a lower flange, disposed in overlapping relationship to the inner peripheral lip, cooperating with said inner peripheral lip to create a labrynthian seal operative to impede water flow out of the boiling water reservoir.

8. The invention of claim 7, further comprising a thermostat, seated within the base and coupled to the heater.

9. The invention of claim 7 wherein the food tray comprises a surface shaped to facilitate radial drainage to the drainage surface and into the condensate trough.

10. The invention in claim 7 wherein the food tray defines a central baffle, vertically aligned with the heater, said baffle operative to contain heated water in a vertical relationship with the heater in order to accelerate steam formation.

11. The invention of claim 7 wherein the condensate trough is disposed around the boiling water reservoir, and comprises an inner peripheral wall, an outer peripheral wall, and an outer peripheral lip disposed adjacent to the outer peripheral wall.

12. The invention of claim 7, further comprising a cover which defines a rim, said rim cooperating with the outer peripheral lip to form an outer seal, and said cover also comprising means for venting pressure within the steam cooking utensil.

13. The invention of claim 7 wherein the imperforate surface defines a multiplicity of raised surfaces effective to facilitate radial drainage through the drainage surface into the condensate trough.

14. The invention of claim 7 wherein the drainage surface comprises a perforated surface vertically aligned with the condensate trough.

15. The invention of claim 7 wherein the means for supporting the food tray comprises a plurality of protrusions which extend upwardly from the base, such that the imperforate surface of the food tray is supported vertically over the boiling water reservoir by the protrusions.

16. A steam cooking utensil comprising:
   a base;
   a boiling water reservoir defined by the base and adapted to contain a quantity of boiling water;
   means for heating water contained in the boiling water reservoir to form steam;
   a condensate trough defined by the base such that the base, the boiling water reservoir and the condensate trough are integrally molded in one piece and the condensate trough is thermally insulated from the heating means;
   a food tray comprising an imperforate surface adapted to support a food product, and a drainage surface adapted to drain fluid from the imperforate surface;
   means for supporting said food tray in a relationship to the boiling water reservoir and the condensate trough such that the imperforate surface is aligned with the boiling water reservoir, the drainage surface is aligned with the condensate trough, and condensed steam flows from the imperforate surface to the drainage surface and into the condensate trough, thereby substantially preventing the flow of condensate from the imperforate surface to the boiling water reservoir and limiting the rate of evaporation of condensate from the trough.

17. The invention of claim 16 wherein the drainage surface comprises a perforated surface vertically aligned with the condensate trough.

18. The invention of claim 16, further comprising means for defining a labrynthian seal, operative to impede the loss of water from the boiling water reservoir during the steaming process.

19. The invention of claim 16 wherein the means for supporting the food tray comprises a plurality of protrusions which extend upwardly from the base, such that the imperforate surface of the food tray is supported vertically over the boiling water reservoir by the protrusions.

20. The invention of claim 16, further comprising:
   means for covering the food tray, the condensate trough and the boiling water reservoir, such that steam generated by the heating means is localized within the steam cooking utensil and does not freely diffuse away from the reservoir; and
   means for venting pressure from the steam cooking utensil.

21. The invention of claim 16 wherein the condensate trough is disposed in annular relationship to the boiling water reservoir.

22. A steam cooking utensil comprising:
   a base;
   a boiling water reservoir defined by and integral with the base and adapted to contain a volume of water;
   means for heating water contained in the boiling water reservoir;
   a condensate trough, defined by and integral with the base, disposed in peripheral relationship to the boiling water reservoir, and defining an outer peripheral lip;
   thermostat means, mounted in the base and coupled to the heating means, for arresting the operation of the heating means when all the water in the boiling water reservoir has evaporated therefrom;
   a food tray comprising an imperforate surface and an array of peripheral apertures, said imperforate surface disposed centrally to the array of peripheral apertures;
   means for supporting said food tray in a vertical relationship to the boiling water reservoir and the condensate trough, said food tray shaped and positioned such that the imperforate surface is vertically aligned with the boiling water reservoir, and the array of peripheral apertures is vertically aligned with the condensate trough;
   a cover, which defines a rim shaped to cooperate with the outer peripheral lip of the condensate trough to form a seal such that a steaming chamber is defined around the food tray; and
   means, included in the cover, for venting steam from the cover to maintain the steaming chamber at substantially atmospheric pressure;
   said boiling water reservoir, heating means, condensate trough, food tray, and supporting means cooperating to cause steam condensate formed over the imperforate surface to flow through the array of peripheral apertures and into the condensate trough, thereby isolating said condensate from the heating means.

23. The invention of claim 22, further comprising means for defining a labrynthian seal, operative to impede the loss of water from the boiling water reservoir during the steaming process.

24. A steam cooking utensil comprising:
   a base;
   a boiling water reservoir defined by the base, said reservoir comprising an inner peripheral wall with which defines an inner peripheral lip and a plurality of protrusions;
   a heater, mounted in the base, disposed centrally within the reservoir;
   a heater well, disposed adjacent the heater;
   a condensate trough, defined by the base, disposed in annular relationship to the boiling water reservoir and thermally insulated from the heater, said trough defined by the inner peripheral wall, an outer peripheral wall, and an outer peripheral lip, said outer peripheral lip disposed adjacent to the outer peripheral wall such that the base, the boiling water reservoir, the condensate trough, the inner peripheral wall, the outer peripheral wall, the inner peripheral lip, the outer peripheral lip and the protrusions are integrally molded and formed in one piece;
   thermostat means, mounted in the base and coupled to the heater, for switching off the heater when the condensate trough attains a preselected temperature;
   a food tray comprising an imperforate central surface and an array of peripheral apertures, said food tray supported by the protrusions, such that said imperforate central surface is vertically aligned with the boiling water reservoir and said peripheral apertures are vertically aligned with the condensate trough and said food tray further comprising a central baffle vertically aligned with the heater well, said baffle operative to direct heated water in a vertical relationship to the heater well such that steam formation is accelerated between the heater well and the baffle;

a cover which defines a rim shaped to cooperate with the outer peripheral lip of the condensate trough to form a seal;

an upper chamber, defined by the cover; and means, included in the cover, for maintaining the upper chamber at substantially atmospheric pressure.

25. The invention of claim 24 wherein the imperforate central surface is shaped to facilitate radial drainage through the peripheral apertures into the condensate trough.

26. The invention in claim 24 wherein the imperforate central surface defines a multiplicity of raised surfaces effective to facilitate radial drainage through the peripheral apertures into the condensate trough.

27. A steam cooking utensil comprising:

a base;

a boiling water reservoir defined by the base, said reservoir comprising an inner peripheral wall with which defines an inner peripheral lip and a plurality of protrusions;

a heater, mounted in the base, disposed centrally within the reservoir;

a condensate trough, defined by the base, disposed in annular relationship to the boiling water reservoir and thermally insulated from the heater, said trough defined by the inner peripheral wall, an outer peripheral wall, and an outer peripheral lip, said outer peripheral lip disposed adjacent to the outer peripheral wall;

a food tray comprising an imperforate central surface and an array of peripheral apertures, said food tray supported by the protrusions, such that said imperforate central surface is vertically aligned with the boiling water reservoir and said peripheral apertures are vertically aligned with the condensate trough;

a cover which defines a rim shaped to cooperate with the outer peripheral lip of the condensate trough to form a seal;

an upper chamber, defined by the cover; and means, included in the cover, for maintaining the upper chamber at substantially atmospheric pressure;

wherein the food tray defines a lower flange disposed in overlapping relationship to the inner peripheral lip, said lower flange cooperating with said inner peripheral lip to create a labrynthian seal operative to impede water flow from the boiling water reservoir to the condensate trough.

28. The invention of claim 27 wherein the food tray defines a central baffle vertically aligned with the heater, said baffle operative to direct heated water back to the vicinity of the heater in order to accelerate steam formation by the heater.

29. The invention of claim 27 wherein the imperforate central surface is shaped to facilitate radial drainage through the peripheral apertures into the condensate trough.

30. The invention in claim 27 wherein the imperforate central surface defines a multiplicity of raised surfaces effective to facilitate radial drainage through the peripheral apertures into the condensate trough.

31. A steam cooking utensil comprising:

means for defining a boiling water reservoir;

a heater mounted adjacent a central portion of the reservoir to heat water contained in the reservoir;

means for supporting food to be steamed above the reservoir, said supporting means defining an imperforate surface above the heater; and a baffle which extends downwardly from the supporting surface over the heater, said baffle shaped to define a partially enclosed region of the supporting surface in alignment with the heater;

said baffle effective to impede the outward flow of water, heated by the heater and splashed by the heater againt the partially enclosed region, radially away from the partially enclosed region.

32. A steam cooking utensil comprising:

means for defining a boiling water reservoir;

a heater mounted adjacent a central portion of the reservoir to heat water contained in the reservoir;

means for supporting food to be steamed above the reservoir, said supporting means defining an imperforate surface above the heater; and a baffle which extends downwardly from the supporting surface over the heater, said baffle shaped to define a partially enclosed region of the supporting surface in alignment with the heater;

said baffle effective to impede the outward flow of water, heated by the heater and splashed by the heater against the partially enclosed region, radially away from the partially enclosed region;

wherein the means for defining the reservoir further comprises means for defining a peripheral lip extending around the reservoir and wherein the supporting means further comprises a flange positioned adjacent the lip and shaped to form a labrynthian seal with the lip to impede the flow of water out of the reservoir.

* * * * *

UNITED STATES PATENT AND TRADEMARK OFFICE
CERTIFICATE OF CORRECTION

PATENT NO. : 4,509,412

DATED : April 9, 1985

INVENTOR(S) : Stephen L. Whittenburg et al

It is certified that error appears in the above-identified patent and that said Letters Patent is hereby corrected as shown below:

Column 10, line 29, "againt" should read -- against --.

Signed and Sealed this

Eighth Day of July 1986

[SEAL]

Attest:

DONALD J. QUIGG

Attesting Officer

Commissioner of Patents and Trademarks

REEXAMINATION CERTIFICATE (2180th)
United States Patent [19]
Whittenburg et al.

[11] B1 4,509,412
[45] Certificate Issued  Jan. 11, 1994

[54] FOOD STEAMING DEVICE

[75] Inventors: Stephen L. Whittenburg, Overland Park, Kans.; David D. McCormick; William J. Tweed, both of Kansas City, Mo.; A. Aykut Ozgunay, Clinton, Mo.; James T. Williams, Sacramento, Calif.

[73] Assignee: Rival Manufacturing Company, Kansas City, Mo.

Reexamination Request:
No. 90/003,005, Mar. 23, 1993

Reexamination Certificate for:
Patent No.: 4,509,412
Issued: Apr. 9, 1985
Appl. No.: 472,193
Filed: Mar. 4, 1983

[51] Int. Cl.⁵ .................................... A47J 27/04
[52] U.S. Cl. ............................ 99/331; 99/413; 99/446; 126/20; 126/369; 219/401; 219/441; 426/510
[58] Field of Search ............ 99/331, 413, 415, 446; 126/20, 369; 219/401, 441; 426/510

[56] References Cited
U.S. PATENT DOCUMENTS

| Number | Date | Name |
|---|---|---|
| D. 113,632 | 3/1939 | Howlett . |
| D. 230,935 | 3/1974 | Lloveras . |
| 244,180 | 7/1881 | Campbell . |
| 263,049 | 8/1882 | Krehbiel . |
| 279,956 | 6/1883 | Knous . |
| 282,587 | 8/1883 | Swink . |
| 354,240 | 12/1886 | Roberts . |
| 366,960 | 7/1887 | Johnson et al. . |
| 560,336 | 5/1896 | Willson . |
| 607,759 | 7/1898 | Mathy . |
| 636,528 | 11/1899 | Henderson . |
| 776,926 | 12/1904 | Misener . |
| 780,851 | 1/1905 | Wilson . |
| 869,903 | 11/1907 | Harloe . |
| 907,154 | 12/1908 | Lewis et al. . |
| 925,781 | 6/1909 | Mathy . |
| 926,028 | 6/1909 | Smith . |
| 1,175,442 | 3/1916 | Hanks . |
| 1,608,395 | 11/1926 | Hensel et al. . |
| 2,089,411 | 8/1937 | Olsson et al. . |
| 2,131,663 | 9/1938 | Hughes . |
| 2,145,263 | 9/1939 | Huntzinger et al. . |
| 2,554,412 | 5/1951 | Kavanagh . |
| 2,622,591 | 12/1952 | Bramberry . |
| 2,715,898 | 9/1951 | Michaelis et al. . |
| 2,718,842 | 9/1955 | Klemm . |
| 2,761,375 | 9/1956 | Jepson . |
| 2,766,366 | 10/1956 | Eckhoff . |
| 2,947,304 | 8/1960 | Ashley . |
| 3,078,783 | 2/1963 | Lee, Sr. . |
| 3,147,689 | 9/1964 | Sakamoto et al. . |
| 3,275,801 | 9/1966 | Curchill . |
| 3,485,163 | 2/1969 | Arita . |
| 3,659,584 | 5/1972 | Doyle et al. . |
| 3,869,595 | 3/1975 | Collins et al. . |
| 4,045,653 | 8/1977 | Soper et al. . |
| 4,052,590 | 10/1977 | Anderl et al. . |
| 4,115,918 | 9/1978 | Anderl et al. . |
| 4,148,250 | 4/1979 | Miki et al. . |
| 4,197,791 | 4/1980 | Vieceli et al. . |
| 4,452,132 | 6/1984 | Miller et al. . |

FOREIGN PATENT DOCUMENTS

| Number | Date | Country |
|---|---|---|
| 75371 | 2/1919 | Austria . |
| 25389 | 10/1986 | Canada . |
| 270722 | 9/1912 | Fed. Rep. of Germany . |
| 271878 | 9/1912 | Fed. Rep. of Germany . |
| 271879 | 11/1912 | Fed. Rep. of Germany . |
| 1082456 | 12/1954 | France . |
| 2329 | of 1909 | United Kingdom . |
| 5969 | of 1912 | United Kingdom . |
| 7612 | of 1913 | United Kingdom . |
| 209721 | 11/1924 | United Kingdom . |

*Primary Examiner*—Timothy F. Simone

[57]  ABSTRACT

A steam cooking utensil is disclosed which includes a base; a boiling water reservoir and a condensate trough defined by the base; and a heater disposed centrally to the boiling water reservoir, mounted in the base, and coupled to a thermostat also mounted in the base. The condensate trough is disposed in annular relationship to the boiling water reservoir. A food tray defining a imperforate central surface and an array of peripheral aperatures is supported such that the imperforate sur-

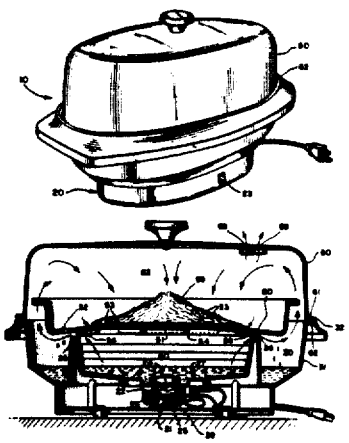

face is vertically aligned with the boiling water reservoir and the array of peripheral apertures is vertically aligned with the condensate trough. A cover having a bottom opening defined by a rim is positioned over the food tray, condensate trough and boiling water reservoir, such that the rim cooperates with an outer peripheral lip of the condensate trough to form a seal. The disclosed steam cooking utensil operates to cook food quickly, cleanly and efficiently. The boiling water reservoir remains free from condensate residues even after boiling dry, and the food product remains free from excess moisture.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–32 is confirmed.

* * * * *